Figure 1:
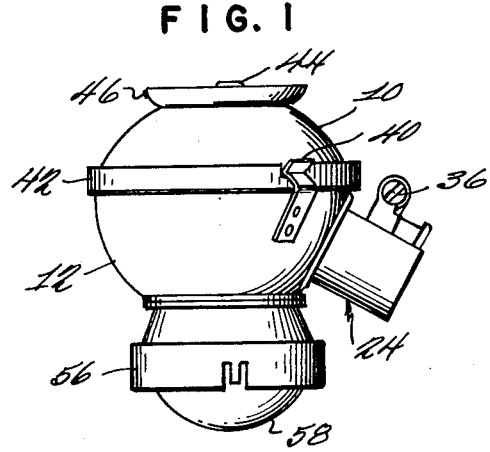

Feb. 23, 1965 R. G. NORDQUIST 3,170,636
REFLECTIVE LAMPS
Filed April 15, 1963 2 Sheets-Sheet 1

INVENTOR
ROBERT G. NORDQUIST

BY *Cushman, Darby & Cushman*

ATTORNEYS

INVENTOR
ROBERT G. NORDQUIST

BY *Cushman, Darby & Cushman*

ATTORNEYS

United States Patent Office 3,170,636
Patented Feb. 23, 1965

3,170,636
REFLECTIVE LAMPS
Robert G. Nordquist, Springfield, Ohio, assignor to Grimes Manufacturing Company, Urbana, Ohio, a corporation of Ohio
Filed Apr. 15, 1963, Ser. No. 272,967
11 Claims. (Cl. 240—41.3)

This invention relates to the art of reflective type lamps, and particularly to improvements therein by which a greater amount, if not 100%, of the light energy from the source is utilized.

In the following discussions, utilization of light rays or energy emanating from a light source is referred to without regard to any loss from the reflective surfaces or lens. In other words, it is assumed for purposes of these discussions that the reflectors and lens reflect and transmit received light at 100% efficiency. Of course, in practice, this is not necessarily fully accurate, but the approach thereto is sufficient to consider it here in this manner.

In the past, lamps with reflectors of various configurations have been employed, but either the reflector or reflectors were of improper configuration or did not reflect a sufficient amount of light rays, or had the wrong portion of the reflector blocked off by the bulb base, to give the maximum possibility of light utilization from an approximate point source of light such as the filament in a light bulb.

It is the primary object of this invention to provide a lamp having first and second dome means facing each other with the first dome means being of ellipsoidal shape and the other of hemispherical shape and having a center coinciding with the first focal point of the ellipsoid, with a source of light being disposed at the coinciding points, and with the hemispherical dome means having a light aperture at its vertex so that all light rays pass through the light aperture either directly or by reflection from one or both of the dome means, there being a support for said light source extending through the hemispherical surface at an angle to the major axis of the ellipsoidal surface.

Normally, the support or base of the light source, for example a filament, in a lamp arrangement, is at the vertex of the reflector opposite the light aperture. That type of an arrangement, however, is exceptionally disadvantageous from the standpoint that the vertex of the reflector surface is a main part of the reflector which when prevented from being utilized causes a notable absence of light output in the center of the reflected group of light rays. This is not the situation when the reflecting surface which is blocked is that which is at the lower side of the focal point, as is the situation in this invention.

Another object of this invention is to shape the ellipsoidal reflecting surface such that the further focal point thereof is between the first focal point and a planoconvex lens which then collects the reflected light rays as they diverge from the second focal point and also collects the direct light rays received through the light aperture to provide from the lamp a controlled cone of light.

It is also an object of this invention to provide such a lamp as above indicated for a variety of purposes including, without limitation intended, aircraft lamps such as overhead passenger reading lamps and cargo flood lamps, marine lamps and bed lamps.

Figure 2:
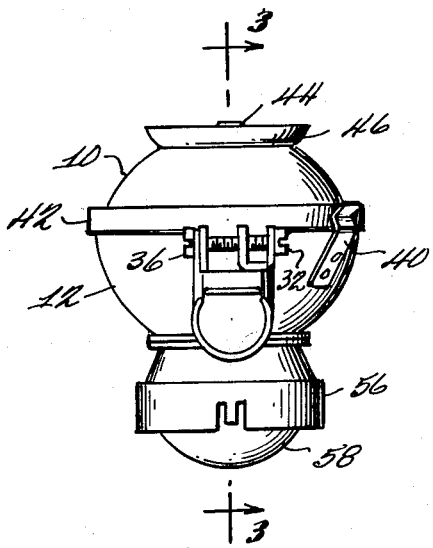
Figure 3:
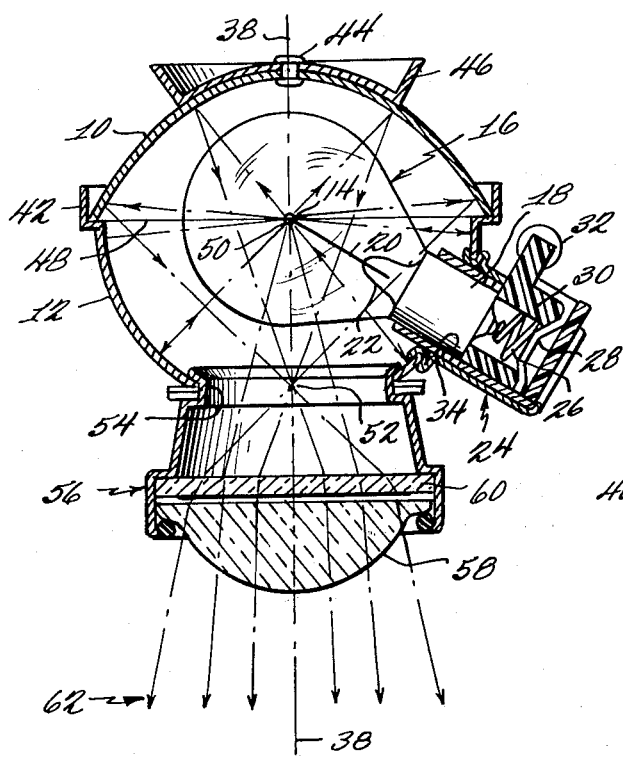
Figure 4:
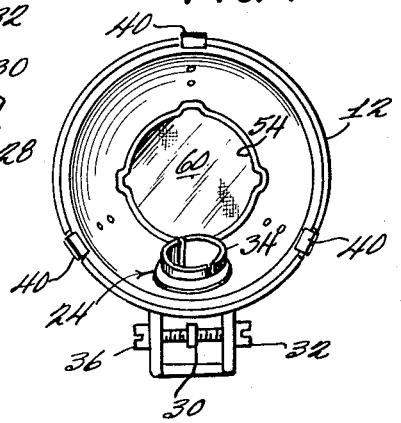
Figure 5:
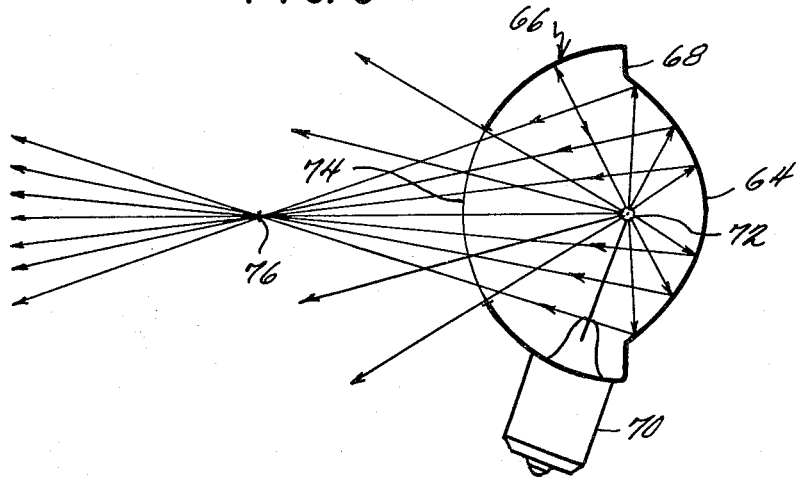
Figure 6:
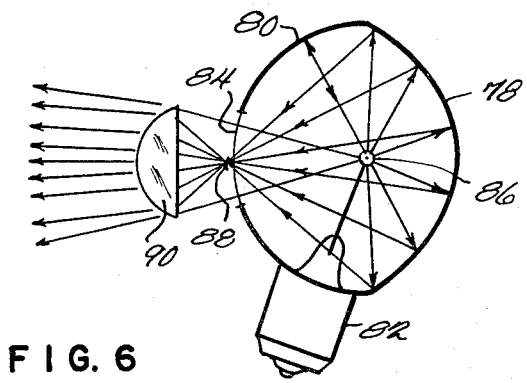

Further objects and advantages of this invention will become apparent upon reading the appended claims and the following detailed description of several embodiments of the invention in conjunction with the drawings, in which:

FIGURE 1 is an elevational view with the bulb socket rightward;
FIGURE 2 is an elevational view locking leftward at FIGURE 1;
FIGURE 3 is a cross sectional view taken along the lines 3—3 of FIGURE 2;
FIGURE 4 is a plan view of FIGURE 2 with the ellipsoidal reflecting cap removed;
FIGURE 5 is a diagrammatric illustration of another embodiment; and
FIGURE 6 is another diagrammatic embodiment of the invention.

With regard to the embodiments shown in FIGURES 1–4, it may be noted that there is a first dome means 10 and a second dome means 12. As is readily apparent, these domes are inverted relative to each other so that their interior surfaces face one another. Additionally, their interior surfaces are reflective in nature, so that actually domes 10 and 12 are reflectors which interiorly reflect rays of light emanating from a source or filament 14 of a conventional bulb 16 which has a base 18, of the bayonet type for example. Filament 14 is supported in the usual manner by electrically conducting wires 20 embedded in a glass bead 22 which upstands from base 18.

Light bulb 16 is disposed in a conventional bayonet socket 24 so that its center terminal is in firm contact with spring 26 which, in turn, is in electrical contact with a metallic element 28. This latter element extends upwardly about insulator 30 to a screw-threaded terminal 32. On the other hand, the other terminal of light bulb 16 makes firm contact via the outer periphery of base 18 with a metal socket element 34 which extends outwardly past an insulator to a second screw-threaded terminal 36. As is particularly apparent from FIGURES 3 and 4, socket 24 extends through an aperture in the side of reflector 12, and the angle of extension therethrough is acute relative to the longitudinal axis 38 of reflectors 10 and 12.

The two reflectors 10 and 12 are releasably secured together by resilient detents or retaining springs 40, of which there may be three, for example, equally spaced about the circumference of the domes. Reflector 12 has at its uppermost end an enlarged diameter or rim 42 which receives the edge of reflector 10. To release reflector 10 from detents 40 and remove it from the rim 42 so that light bulb 16 may be readily replaced for example, there is secured to the reflective cap 10, as by rivet 44, a convenient upstanding finger-gripping ring 46, which when pulled upwardly will separate the two reflectors.

Reflector 10 is the vertex portion of an ellipsoidal surface cut on the focal plane 48, which passes perpendicularly of the major axis 38 through the closer focal point 50, i.e., the one that is more adjacent the vertex than the second focal point 52. Because reflector 10 is ellipsoidal, all light rays emanating from the filament source 14 at focal point 50 and impinging on the reflector 10 will be reflected thereby back through the second focal point 52, as is evident by the illustrated light rays.

In order to prevent the loss of light rays which emanate from filament 14 in a downward direction at an angle relative to axis 38 greater than that encompassed by the light aperture 54, reflector 12 is made hemispheroidal so that all light rays which impinge on its surface will be reflected directly back through the upper focal point 50 and thence onto the ellipsoidal reflecting surface by virtue of which they are reflected to the outer focal point 52. The focal plane 48 of the ellipsoidal reflector 10 is also the equator plane for the hemispherical reflector 12, and the two reflectors are centered so that focal point 50 is also the center of reflector 12.

Light aperture 54, which in the embodiment being described is a circular opening in the hemispherical reflector 12 centered on major axis 38, has secured to its periphery in any convenient manner a lens holder 56, which holds not only a plano-convex lens 58, but also a glass filter lens 60 which is for the purpose of breaking up light striations in the rays received thereby. As is evident from FIGURE 3 the second focal point 52 is between the first focal point 50 and lens 58. Therefore, lens 58 collects light rays which are diverging from focal point 52 and converges them into a controlled light cone 62 of 30° or so, as desired. The direct light rays from focal point 50 are also controlled by lens 58.

In the embodiment of FIGURES 1–4, it will be noted from FIGURE 3 that the second focal point 52 is on the major axis 38 at approximately the point where completion of the hemisphere of reflector 12 would intersect that axis. Because focal points 50 and 52 can be so close together, i.e., because focal point 52 can be in that general area, the overall height of the lamp can be made minimum because lens 58 can consequently be positioned close to the light aperture 54 in reflector 12. Careful construction is necessary in making reflector 10 of just the right ellipsoidal configuration to place the lower focal point 52 at the desired position. This feature is that which enables a relatively small lamp to provide a controlled cone of light at a relatively high output, the feature of the light bulb base 18 and socket 24 blocking reflection only from a relatively small area of the hemispheroidal reflector being a main contributor to the high intensity of the attained output from the lamp.

Another embodiment of this invention is illustrated diagrammatically in FIGURE 5. This is an embodiment which is itself a light bulb the glass envelope of which is exteriorly coated with reflective material, for example aluminum or silver, to the extent desired. In this embodiment the ellipsoidal dome 64 and hemispheroidal dome 66 along with their common plane connecting means 68 are blown into such shape in any conventional light bulb glass blowing manner, after which the bulb base 70 is inserted through an aperture in the hemispherical dome so that the filament and closer focal point of the ellipsoidal vertex dome 64 and center of the hemispherical dome 66 all coincide at point 72. Then, all of the exterior glass surfaces of the lamp are coated with reflective material, except for a light aperture 74. In this embodiment the second focal point 76 is at a substantial distance in front of the vertex of the hemispherical surface, for example approximately the same distance in front thereof as focal point 76 is inwardly thereof. This type of light bulb may be employed as a general lighting lamp without using any modifying lens to control the output cone of light. From FIGURE 5 it is apparent some of the light rays from the filament at focal point 72 exit through the light aperture 74 directly, while others pass therethrough after being reflected by one or both of the reflecting surfaces of domes 64 and 66.

A still further embodiment of the invention, which is especially suitable as a miniaturized low candle power or wattage long-life reflector type lamp for bed reading purposes for example, is shown in FIGURE 6. In this embodiment the ellipsoidal reflector 78 and hemispheroidal reflector 80 have the same diameter along their coincident respective focal and equator planes, and are blown glass as in the FIGURE 5 embodiment. Again, the bulb base 82 extends through a side of the hemispherical reflector at an angle to the major axis of the ellipsoidal vertex reflector 78. The hemispherical reflector 80 has in it a light aperture 84, which is not coated with reflective material as is the ellipsoidal reflector and the remainder of the hemispherical reflector. In this embodiment, as in all others, the first focal point 86 of the ellipsoidal reflector 78 is in the plane of the equator of the hemispherical reflector 80. The second focal point 88 is approximately intersected by the hemispherical section, whereby lens 90 may be disposed close to the lamp and effect a desired and controlled cone of light.

In all embodiments of this invention, it is apparent from the foregoing that as close as physically possible 100% of the light rays or energy produced at the source is made available for use without any loss in the number of light rays.

Thus, there has been disclosed several embodiments of this invention which provide for the objects and advantages previously mentioned. Other objects, advantages, and even modifications of this invention will occur to those of ordinary skill in the art upon reading this disclosure, but it is to be realized that this disclosure is intended to be exemplary and not limitative, the scope of the invention being defined by the appended claims.

What is claimed is:

1. A lamp comprising first dome means forming an ellipsoidal interiorly-reflecting vertex surface having a major axis containing first and second focal points respectively at further distances from the surface, the edge of said surface terminating substantially in the first focal point plane which is perpendicular to said axis, second dome means connected to said first dome means and forming a hemispherical interiorly-reflecting surface which faces said ellipsoidal surface and has its center of curvature at said first focal point, said second dome means including a predetermined light aperture through said hemispherical surface at its vertex centered on said axis, a light source centered on said first focal point, and means extending through said second dome means at an acute angle relative to said axis for supporting said light source and supplying electrical signals thereto to cause substantially all the light rays emanating from said source to pass through said light aperture either directly or by reflection from said reflecting surfaces, the so reflected rays being caused by said surfaces to converge at said second focal point.

2. A lamp as in claim 1 and further including a lens centered on said axis at a point further from said first focus than the said second focus so as to intercept all the said direct light rays passing through said light aperture and all of the said reflected light rays as they diverge from said second focal point and effect a controlled cone of light.

3. A lamp as in claim 2 and further including a filter lens disposed between said second focal point and the first mentioned lens for breaking up light striations.

4. A lamp as in claim 1 wherein said first and second dome means are integral and comprise a glass envelope suitably coated to form said reflecting surfaces, said light source being a filament.

5. A lamp as in claim 4 wherein the said second dome means is of substantially larger diameter than the first dome means at said focal plane.

6. A lamp as in claim 4 wherein said first and second dome means are of substantially the same diameter at said focal plane.

7. A light bulb comprising the lamp of claim 4 and having a base including the said means which extends through the second dome means.

8. A lamp as in claim 1 wherein the last-said means and said light source in combination comprise a light bulb, and the said first and second dome means are external to said bulb.

9. A lamp as in claim 8 wherein the said first and second domes releasably connect together for changing of the said light bulb.

10. A lamp as in claim 8 and further including a lens holder connected to the said second dome at said light aperture, and a plano-convex lens disposed in said holder to intercept all the said direct light rays passing through said aperture and all of the said reflected light rays as they diverge from said second focal point and effect a controlled cone of light.

11. A lamp as in claim 10 and further including a filter lens disposed in said holder on the plane side of said plano-convex lens between same and said second focal point for breaking up light striations.

References Cited by the Examiner
UNITED STATES PATENTS

| | | | |
|---|---|---|---|
| 1,883,360 | 10/32 | Fortney | 240—41.3 |
| 2,154,842 | 4/39 | Glenn | 240—41.3 |
| 2,338,901 | 1/44 | Chiti | 240—41.3 |
| 2,876,338 | 3/59 | Seligson | 240—46.49 |
| 2,957,073 | 10/60 | Legge | 240—7.35 |
| 2,963,571 | 12/60 | Roggan | 240—46.59 |
| 2,993,987 | 7/61 | Diffie | 240—41.1 |

NORTON ANSHER, *Primary Examiner.*